United States Patent [19]

Kato et al.

[11] Patent Number: 4,726,052
[45] Date of Patent: Feb. 16, 1988

[54] RADIO TELEPHONE SYSTEM AND METHOD FOR CONTROLLING SAME

[75] Inventors: Kaoru Kato, Tokyo; Kazuhiro Yoshizawa, Kashiwa; Akio Yotsutani; Noboru Saegusa, both of Tokyo; Isao Sasaki, Hachioji; Koichi Ito; Akio Toki, both of Hino, all of Japan

[73] Assignees: Nippon Telegraph & Telephone Corp.; NEC Corp., both of Tokyo; Kabushiki Kaisha Toshiba, Kawasaki, all of Japan

[21] Appl. No.: 914,352

[22] Filed: Oct. 2, 1986

[30] Foreign Application Priority Data

Oct. 3, 1985 [JP] Japan ................................. 60-221063

[51] Int. Cl.$^4$ ............................................. H04Q 7/04
[52] U.S. Cl. ...................................... 379/61; 379/63; 320/13; 455/127
[58] Field of Search ............... 320/13, 39, 40; 379/61, 379/62, 63, 58, 56; 455/127; 340/636

[56] References Cited

U.S. PATENT DOCUMENTS

| | | | |
|---|---|---|---|
| 4,354,118 | 10/1982 | Spencer | 317/66 |
| 4,471,492 | 9/1984 | Mann et al. | 455/73 |
| 4,509,201 | 4/1985 | Sekigawa | 455/73 |
| 4,562,307 | 12/1985 | Bursztejn et al. | 379/63 |
| 4,568,868 | 2/1986 | Schlepp et al. | 320/5 |
| 4,595,872 | 6/1986 | Ball | 320/13 |
| 4,622,508 | 11/1986 | Mattheau et al. | 320/13 |

Primary Examiner—Robert Lev
Attorney, Agent, or Firm—Finnegan, Henderson, Farabow, Garrett & Dunner

[57] ABSTRACT

In a radio telephone system comprising a radio telephone set utilizing a rechargeable battery, and a base unit connected to the radio telepone set through a radio channel for exchanging a speech signal between the radio telephone set and a wired telephone line, there are provided a detector for detecting the charged state of the battery, a terminating device responsive to the output signal of the detector for terminating the radio channel between the radio telephone set and the base unit.

20 Claims, 5 Drawing Figures

RADIO TELEPHONE SYSTEM AND METHOD FOR CONTROLLING SAME

BACKGROUND OF THE INVENTION

1. Field of the Invention

This invention relates to a radio telephone system and a method for controlling the radio telephone system comprising a radio telephone set utilizing a rechargeable battery as its electric source, and a base unit connected to the radio telephone set through a radio channel and through which speech signals are transmitted between the radio telephone set and a wired telephone line, and more particularly, a radio telephone system and its controlling method capable of prohibiting a continuous transmission state caused by the failure in the operation of a speech channel termination switch while the battery of the radio telephone set is being charged.

2. Description of the Prior Art

As is well known in the art, a prior art radio telephone system is constituted by a base unit connected to a wired telephone line, and a radio telephone set controlled by the base unit for exchanging speech signals between the radio telephone set and the wired telephone line. When an origination switch in the radio telephone set is operated, a control circuit controls a transmitter and a receiver to establish a radio speech channel between the radio telephone set and the base unit, thus permitting speech. When the speech is terminated, a termination switch is closed for terminating the speech channel.

In an ordinary telephone set, the origination and the termination of the speech channel are effected by on-hook and off-hook operations of a handset of the telephone set, but in some type of the radio telephone systems, the origination and the termination of the speech channel are controlled by independent switches.

In such a system, if the speech channel termination switch fails to be operated when the speech has terminated, the speech channel between the base unit and the radio telephone set, and further between the base unit and the wired telephone line will remain in the speech state, thus prohibiting the channel from being used for other speeches.

Especially, in a system constructed such that the radio telephone set is mounted on and connected to the base unit when not in use so as to charge the battery in the radio telephone set and it is dismounted when in use, since electricity in the electric source is not consumed during the charging, the speech state will be maintained until the troubles is noticed and the speech channel termination switch is operated.

For this reason, a display device or a warning device has been used for informing the fact that the speech state is maintained or a timer is provided for automatically terminating the speech channel when the speech state is maintained beyond a predetermined period.

In the system in which whether the telephone system is in the speech state or not is informed by a display device, the display is likely to be mistaken as a display of other display devices so that there is a defect that the speech channel termination switch cannot be operated correctly.

Where the speech channel is forcibly terminated, there will be a case in which the speech channel is unfavorably terminated during actual talking.

SUMMARY OF THE INVENTION

Accordingly, it is an object of this invention to provide an improved radio telephone system and method for controlling the radio telephone system to prevent a speech channel from being in continuous use state without interfering an actual speech even when a user of the telephone set forgets to perform a speech channel termination operation.

According to this invention, there is provided a radio telephone system comprising a radio telephone set utilizing a chargeable battery as an electric source, a base unit connected to the radio telephone set through a radio channel for exchanging a speech signal between the radio telephone set and a wired telephone line, means for detecting a charged state of the battery and means responsive to the output signal of the detecting means for terminating the radio channel between the radio telephone set and the base unit.

More particularly, by utilizing the fact that after completion of a speech, the radio telephone set is connected to the base unit so as to charge the battery in the radio telephone set, according to this invention, after termination of a speech, the initiation of charging of the battery is detected and the radio channel is terminated in accordance with the detection.

Consequently, according to this invention, initiation of the charging of the battery when a speech is terminated is detected and the detection is used as a speech termination procedure so that continuous use of a speech channel can be prevented even when the user forgets the speech channel termination procedure. Since the speech channel is terminated after termination of an actual speech, no trouble is caused in the actual speech and the speech channel is available for other speeches.

DESCRIPTION OF THE PREFERRED EMBODIMENT

Figure 1:
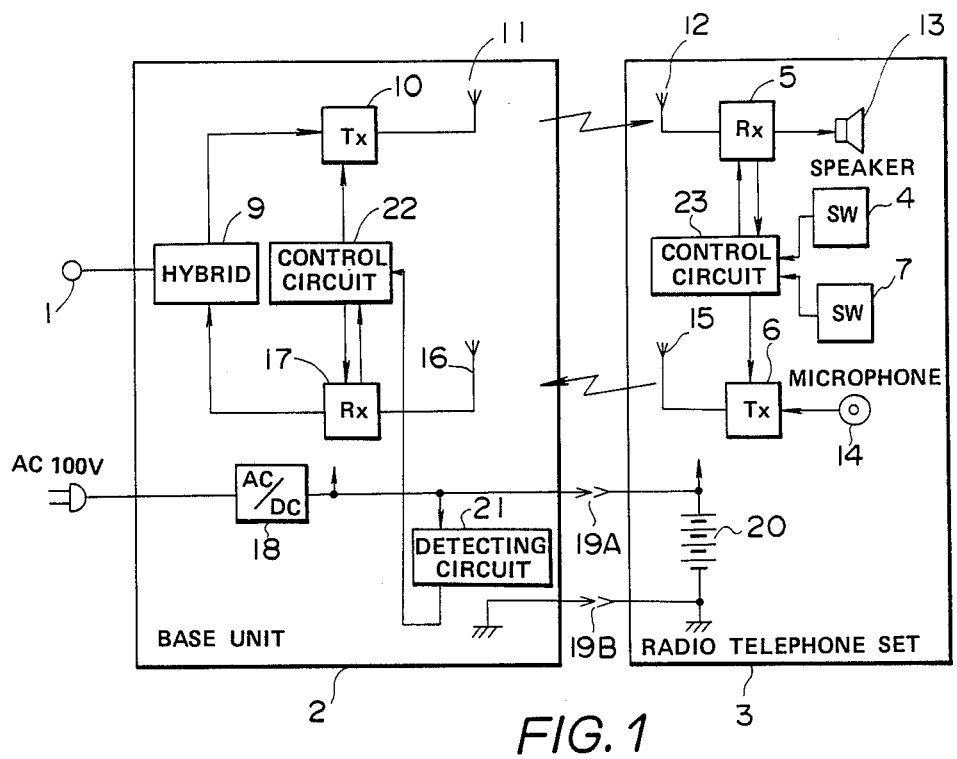
FIG. 1 is a block diagram showing one embodiment of this invention.

In a preferred embodiment of this invention shown in FIG. 1, a speech signal from a wired telephone line 1 is transmitted to a receiving antenna 12 of a radio telephone set 3 via a hybrid circuit 9, a transmitter 10 and a transmitting antenna 11. The received signal is transmitted to a speaker 13 via a receiver 5. A speech signal inputted into a microphone 14 of the radio telephone set 3 is transmitted through a transmitter 6, a transmission antenna 15, a receiving antenna 16, a receiver 17 and the hybrid circuit 9 to the wired telephone line 1.

In a base unit 2, an AC/DC converter 18 energized by a 100 volt alternative current source is utilized and its output is used to charge a battery 20 of the radio telephone set 3 through contacts 19A and 19B. The radio telephone set 3 can be used separately from the base unit 2 by disconnecting the contacts 19A and 19B.

After completion of the speech, if a user fails to operate a speech channel termination switch 7 and connects the radio telephone set 3 to the base unit 2, a detection circuit 21 detects that the battery charging starts. Then, in response thereto, a control circuit 22 disconnects the transmitter 10 from the power source (AC/DC converter 18), thus disabling the transmitter 10. When the receiver 5 detects an interruption in a radio wave from the transmitter, a controller 23 disables transmitter 6 in the radio telephone sets to bring it to a waiting state, thus preventing unfavorable continuous transmission. In this case, a circuit for detecting the radio wave interruption can be constituted by a known noise squelch or carrier squelch circuit.

An origination switch 4 and the speech termination switch 7 may be combined into a single switch which is used for origination by turning it on and for speech termination by turning it off. The charging contacts 19A and 19B may be constituted by metal pieces or plug and jacks.

Figure 2:
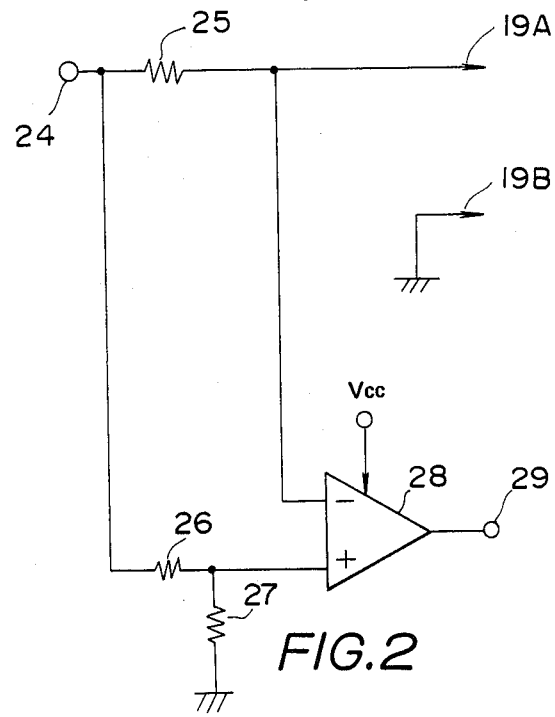
FIG. 2 is a connection diagram showing one example of a detection circuit.

FIG. 2 shows one example of the detection circuit 21, in which the output terminal of the AC/DC converter 18 is connected to a terminal 24 which is connected to contact 19A through a resistor 25 for determining the charging current, and to an inverting input of a comparator 28. The voltage at the terminal 24 is divided by resistors 26 and 27 and the divided voltage is applied to a non-inverting input of the comparator 28.

Suppose now that the input voltage to the terminal 24 is 10 V, the voltage after charging (maximum voltage) of battery 20 is 7 V, the resistors 26 and 27 have resistance value of 100 kΩ and 1MΩ, respectively. Then at the time of not charging, a voltage $$10 \text{ V} \times \{1M\Omega \div (100k\Omega + 1M\Omega)\} = 9 \text{ V}$$

is applied to the non-inverting terminal of the comparator 28, whereas 10 V is applied to the inverting terminal so that the voltage at an output terminal 29 of the comparator 28 is at a low level (about 0 V). On the other hand, at the time of charging, since a voltage of less than 7 V is applied to the inverting terminal, the voltage at the output terminal 29 becomes a high level (=the driving voltage $V_{cc}$ of comparator 28). Consequently, the output voltage of comparator 28 becomes a high level. Thus, whether the battery is being charged or not can be detected from the output of the comparator 28.

The detecting circuit 21, can be substituted by a CMOS inverter or the like. Further the detecting circuit 21 may be installed in the radio telephone set 3 so as to stop the transmission of the electric wave from the radio telephone set 3.

Figure 3:
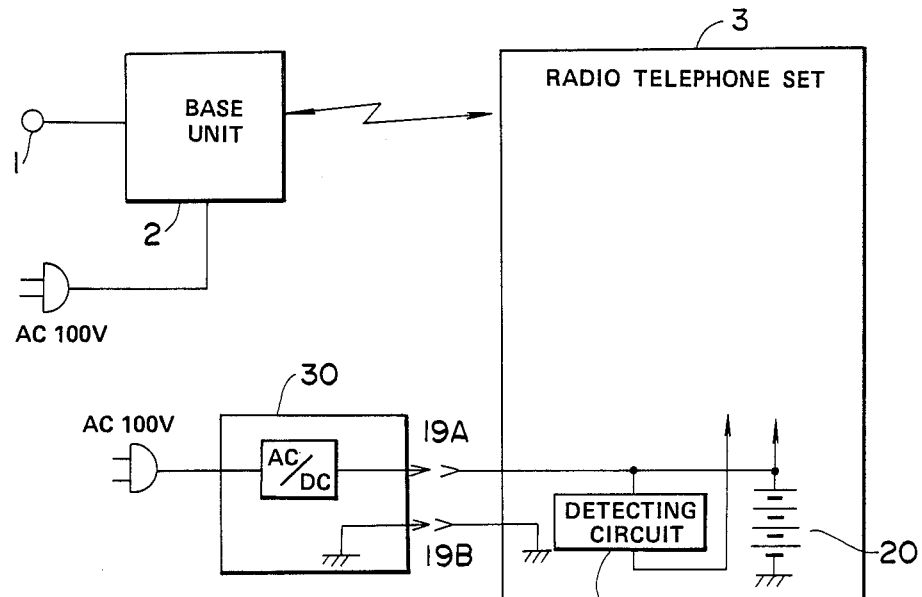
FIG. 3 is a block diagram showing a modified embodiment of this invention.

Instead of installing the AC/DC converter 18 in the base unit 2, an AC/DC converter 30 can be installed on the outside of the base unit 2 as shown in FIG. 3 so as to detect the charging state on the side of the radio telephone set 3.

Figure 4:
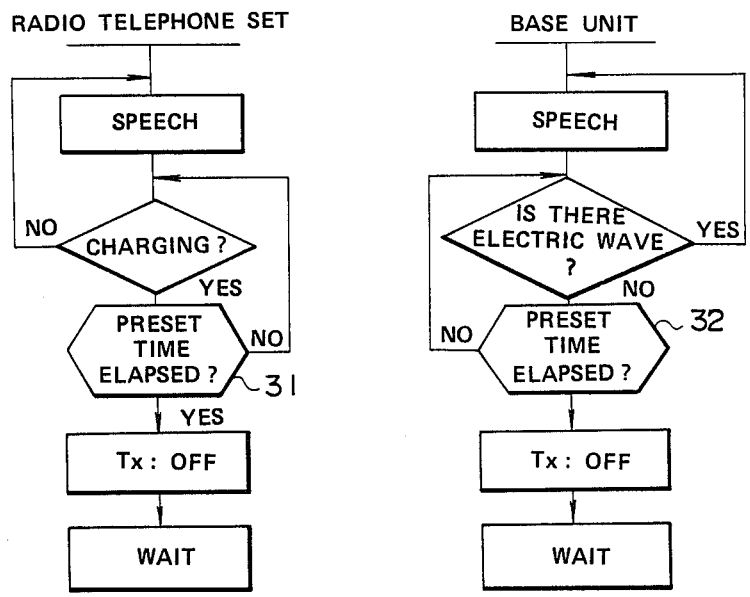
FIGS. 4 and 5 are flow charts showing the operation of the embodiments of this invention.

FIG. 4 shows the operation of the above-described embodiment.

In the flow chart shown in FIG. 4, at steps 31 and 32, a judgment is made as to whether the charging has been made for a predetermined period or not. The purpose of step 31 is to assure the speech channel by disconnecting the radio telephone set from the charging source at once when it is inadvertently connected to the charging source. On the other hand, the purpose of step 32 is to assure the speech channel when the electric wave is temporarily interrupted due to fading etc.

Figure 5:
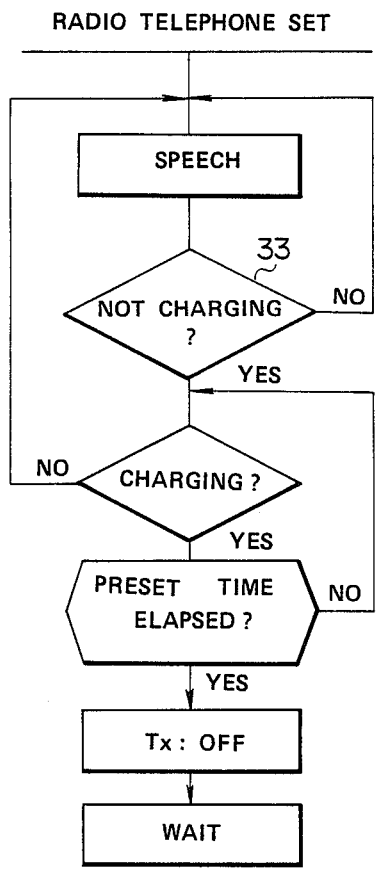

FIG. 5 is a flow chart showing the operation of another embodiment. In the flow chart of this embodiment, a step 33 for detecting whether or not the battery is currently being charged is added to the steps in the FIG. 4. In this embodiment, the speech channel is established while the battery is being charged.

Instead of providing a detector for detecting whether the battery is being charged or not in the base unit or a radio telephone set, it is possible to provide the detector for both the base unit and the radio telephone set. With this construction, both the base unit and the radio telephone set are turned off in response to the output of the detector.

What is claimed is:

1. A radio telephone system comprising:
   a radio telephone set utilizing a rechargeable battery as an electric source;
   a base unit connected to said radio telephone set through a radio chanel for exchanging voice communications by means of a speech signal between said radio telephone set and a wired telephone line;
   charging means for charging said battery;
   means for connecting said radio telephone set to said charging means so as to charge said battery;
   means for detecting whether or not said battery is being charged; and
   means for terminating said radio channel between said radio telephone set and said base unit responsive to an output signal of said detecting means.

2. The radio telephone system according to claim 1 wherein said detecting means is provided at said base unit.

3. The radio telephone system according to claim 1 wherein said terminating means comprises means provided at said base unit for turning on a radio set of said base unit in response to the output of said detecting means, and means provided at said radio telephone set for turning off a radio set of said radio telephone set when there is no received electric wave.

4. The radio telephone system according to claim 1 wherein said detecting means is provided at said radio telephone set.

5. The radio telephone system according to claim 4 wherein said terminating means is provided at said radio telephone set for turning off a radio set of said radio telephone set in response to the output of said detecting means.

6. The radio telephone system according to claim 1 wherein said detecting means comprises a first detecting means provided at said base unit, and a second detecting means provided at said radio telephone set.

7. The radio telephone system according to claim 6 wherein said terminating means comprises means provided at said base unit for turning off a radio set of said base unit in response to an output of said first detecting means, and means provided at said radio telephone set for turning off a radio set of said radio telephone set in response to an output of said second detecting means.

8. The radio telephone system according to claim 1 wherein said terminating means comprises timer means started in responses to an output signal of said detecting means for calculating a predetermined time period, and means responsive to an output of said timer means for terminating a radio channel between said radio telephone set and said base unit.

9. A radio telephone system comprising:
   a radio telephone set utilizing a rechargeable battery as an electric source;
   a base unit connected to said radio telephone set through a radio channel for exchanging voice communications by means of a speech signal between said radio telephone set and a wired telephone line;

charging means provided at said base unit, for charging said battery;

means for connecting said radio telephone set to said base unit so as to charge the battery of said radio telephone set;

means for detecting whether or not said battery is being charged; and means for terminating said radio channel between said radio telephone set and said base unit in response to an output signal of said detecting means.

10. The radio telephone system according to claim 9 wherein said detecting means is provided at said base unit.

11. The radio telephone system according to claim 10 wherein said terminating means is provided at said base unit for turning off a radio set of said base unit in response to an output signal of said detecting means, and means provided at said radio telephone set for turning off a radio set of said radio telephone set when there is no received electric wave.

12. The radio telephone system according to claim 9 wherein said terminating means comprises first timer means provided at said base unit and started in response to an output signal of said detecting means for calculating a definite time period; means for turning off a radio set of said base unit in response to an output of said first timer means, received electric field detecting means provided at said radio telephone set for detecting the fact that there is no received electric field, second timer means provide at said radio telephone set and started in response to an output signal of said received electric wave detecting means for calculating a definite time period, and means responsive to an output signal of said second timer means for turning off a radio set of said radio telephone set.

13. The radio telephone system according to claim 9 wherein said detecting means comprises first detecting means provided at said base unit, and second detecting means provided at said radio telephone set.

14. The radio telephone system according to claim 13 wherein said terminating means comprises means provided at said base unit for turning off a radio set of said base unit in response to an output signal of said first detecting means, and means provided at said radio telephone set for turning off a radio set of said radio telephone set in response to an output signal of said second detecting means.

15. A radio telephone system comprising:

a radio telephone set utilizing a rechargeable battery as an electric source;

a base unit connected to said radio telephone set through a radio channel for exchanging a speech signal between said radio telephone set and a wired telephone set;

charging means provided separately from said base unit, for charging said battery;

means for connecting said radio telephone set to said charging means so as to charge said battery;

means for detecting whether or not said battery is being charged; and means repsonsive to an output signal of said detecting means for terminating said radio channel between said base unit and said radio telephone set.

16. The radio telephone system according to claim 15 wherein said detecting means is provided at said radio telephone set.

17. The radio telephone system according to claim 15 wherein said terminating means is provided at said radio telephone set to turn off a radio set of said radio telephone set in response to an output signal of said detecting means.

18. The radio telephone system according to claim 15 wherein said terminating means comprises timer means provided at said radio telephone set and started in response to an output signal of said detecting means for calculating a definite time period, and means for turning off a radio set of said radio telephone set in response to an output of said timer means.

19. A method for controlling a radio telephone system including a radio telephone set utilizing a rechargeable battery as an electric source and a base unit connected to said radio telephone set through a radio channel for exchanging voice communications by means of a speech signal between said radio telephone set and a wired telephone line, said radio telephone set being connected to said base unit so as to charge said battery, said method comprising the steps of:

detecting charged state of said battery; and terminating said radio channel between said radio telephone set and said base unit responsive to an output signal of said detecting step.

20. The method according to claim 19 wherein said terminating step is for terminating a radio channel between said radio telephone set and said base unit upon elapse of a predetermined time after said detecting step detects that the battery is in charged state.

* * * * *